(12) United States Patent
Beaver et al.

(10) Patent No.: US 7,234,059 B1
(45) Date of Patent: Jun. 19, 2007

(54) ANONYMOUS AUTHENTICATED COMMUNICATIONS

(75) Inventors: Cheryl L. Beaver, Albuquerque, NM (US); Richard C. Schroeppel, Woodland Hills, UT (US); Lillian A. Snyder, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 1014 days.

(21) Appl. No.: 10/072,018

(22) Filed: Feb. 5, 2002

Related U.S. Application Data

(60) Provisional application No. 60/311,733, filed on Aug. 9, 2001.

(51) Int. Cl.
*H04L 9/00* (2006.01)
*G06F 12/14* (2006.01)

(52) U.S. Cl. .................... 713/170; 380/30; 380/283; 380/285; 709/230; 709/232; 709/238; 713/168; 713/180; 713/181

(58) Field of Classification Search .............. None
See application file for complete search history.

(56) References Cited

U.S. PATENT DOCUMENTS

| | | | | |
|---|---|---|---|---|
| 5,453,601 | A * | 9/1995 | Rosen ................... | 705/65 |
| 6,301,660 | B1 * | 10/2001 | Benson ................. | 713/165 |
| 6,327,652 | B1 * | 12/2001 | England et al. ........ | 713/2 |
| 6,560,339 | B1 * | 5/2003 | Iwamura ............... | 380/201 |
| 6,615,350 | B1 * | 9/2003 | Schell et al. .......... | 713/168 |
| 6,950,948 | B2 * | 9/2005 | Neff ..................... | 705/12 |
| 2001/0054155 | A1 * | 12/2001 | Hagan et al. .......... | 713/193 |
| 2002/0004900 | A1 * | 1/2002 | Patel .................... | 713/155 |

OTHER PUBLICATIONS

Yolkowski, James, 'Randomness', Math Lair, Jun. 16, 2001, entire document, http://www.stormloader.com/ajy/random.html.*
Hu, Z., et al, 'Anonymous Micropayments Authentication (AMA) in Mobile Data Network', IEEE INFOCOM 2004, entire document, http:// www.ieee-infocom.org/2004/Papers/02_1.PDF.*
C. Beaver, et al., "A Design for Anonymous, Authenticated Information Sharing", Proceedings of the IEEE Man, System and Cybernetics Information Assurance Workshop (Jun. 2001).
D. Boneh, et al., *Anonymous Authentication with Subset Queries*, Proceedings of the 6th ACM conference on Computer and Communications Security, pp. 113-119 (1999).
D. Chaum, *Untraceable Electronic Mail, Return Addresses and Digital Pseudonyms*, Communications of the ACM, vol. 24, No. 2, pp. 84-88 (1981).

(Continued)

*Primary Examiner*—Nasser Moazzami
*Assistant Examiner*—Ronald Baum
(74) *Attorney, Agent, or Firm*—Robert D. Watson

(57) ABSTRACT

A method of performing electronic communications between members of a group wherein the communications are authenticated as being from a member of the group and have not been altered, comprising: generating a plurality of random numbers; distributing in a digital medium the plurality of random numbers to the members of the group; publishing a hash value of contents of the digital medium; distributing to the members of the group public-key-encrypted messages each containing a same token comprising a random number; and encrypting a message with a key generated from the token and the plurality of random numbers.

26 Claims, 3 Drawing Sheets

OTHER PUBLICATIONS

A. De Santis, et al., *Communication-efficient anonymous group identification*, Proceedings of the ACM Conference on Computer and Communications Security, pp. 73-82 (1998).

B. Gavish, et al., *Anonymous Mechanisms in Group Decision Support Systems Communications,* Decision Support Systems, v. 23, No. 4, pp. 297-328 (1998).

S. Hayne, et al., *Attribution accuracy when using anonymity in group support system,* International Journal of Human Computer Studies, v.47, No. 3, pp. 429-452 (1997).

K. Oishi, et al., *Anonymous public-key certificates and their applications,* IEICE Transactions, vol. E81-A, No. 1, pp. 65-71 (1998).

S. Schechter, et al., *Anonymous Authentication of Membership in Dynamic Groups,* Proceedings of Financial Cryptography '99, vol. 1648 LNCS, pp. 184-195 (1999).

P. Syverson, et al., "Anonymous connections and onion routing", *IEEE Journal on Selected Areas in Communication,* v. 16, No. 4, pp. 482-494 (1998).

* cited by examiner

ANONYMOUS AUTHENTICATED COMMUNICATIONS

CROSS-REFERENCE TO RELATED APPLICATIONS

This application claims the benefit of the filing of U.S. Provisional Patent Application Ser. No. 60/311,733, entitled "Anonymous, Authenticated Communications", filed on Aug. 9, 2001, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to electronic communications which are anonymous yet cryptographically authenticated.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Introduction

The idea of providing anonymous and authenticated communications at the same time may seem like a contradiction. However, there are many situations in which this is desirable. For example, suppose that a database of information is being compiled where the source of the data must be from a trusted set of users, but at the same time the source does not want their identity linked with the data they contribute (e.g., a collection of financial data). The present invention addresses the issues of anonymous messages and communications together with authentication that the source is to be trusted.

Anonymous Messages

Ensuring that the content of a message does not give clues to the author is a non-cryptographic problem. To create an anonymous message, one could simply avoid including identifying information in the message and leave the message unsigned. There may, however, be other clues within the message to identify the writer such as wording, spelling and grammar errors, or choice of typewritten font. Environmental issues such as group make up, size of group, and how well participants know each other may also be factors to consider. If the members do not know each other, getting rid of slang or spelling errors may not be much of an issue. However, it should be kept in mind that if some user is in the habit of using any sort of unique style, then this may be noticeable and while this may not identify the author per se, if multiple messages contain this common style, it may be assumed (correctly or not) that the messages are by the same author. S. Hayne, et al., *Attribution accuracy when using anonymity in group support system*, International Journal of Human Computer Studies, v.47, no. 3, pp. 429-452 (1997) and B. Gavish, et al., *Anonymous Mechanisms in Group Decision Support Systems Communications*, Decision Support Systems, v. 23, no. 4, pp. 297-328 (1998) discuss these issues in more detail. The present discussion concentrates on other design goals that can be achieved cryptographically.

Anonymity and Authentication

In an anonymous environment the sender of a message is unidentifiable. If the users are supposed to be members of a distinguished group, then authentication is necessary to avoid use by non-members. It is also important to guarantee that a message has not been altered since it was sent by an authorized source.

One way to provide authentication is to have all the group members share a common piece of information. Showing knowledge of the information proves valid group membership. For example, the users could share a symmetric encryption/decryption key. When a member wished to send a message to another member, the member would use the key to encrypt the message. The encrypted message would be sent to another group member and if that person could decrypt the message using the shared key, then the receiver would be sure that a valid group member had sent it. Furthermore, the sender of the message would be assured that only a valid group member would be able to decrypt the message. This scheme preserves anonymity: as long as all group members use the same key, no one knows which member encrypted the message. Furthermore it provides data integrity because if a message has been altered since it was sent, it will not decrypt properly.

Although this scheme is simple, there are drawbacks. Group members would have to be trusted not to give the shared secret away to non-group members. If this happened, neither the bad group member nor the unauthorized user who illegitimately obtained the key could be identified. The key would have to be updated whenever a group member left or if the key were suspected of being compromised. The question of key distribution and update can be a serious problem if the group membership is very dynamic or if there is concern of key compromise.

There are several different types of authentication schemes that can preserve anonymity and address more of the issues raised above. For example, S. Schechter, et al., *Anonymous Authentication of Membership in Dynamic Groups*, Proceedings of Financial Cryptography '99, vol. 1648 LNCS, pp. 184-195 (1999) uses public key cryptography to construct verifiable common secret encoding to prove group membership. In their scheme, dynamic group membership is not an issue. One-time certificates or zero-knowledge proofs are other common methods. A. De Santis, et al., *Communication-efficient anonymous group identification*, Proceedings of the ACM Conference on Computer and Communications Security, pp. 73-82 (1998); and K. Oish, et al., *Anonymous public-key certificates and their applications*, IEICE Transactions, vol. E81-A, no. 1, pp. 65-71 (1998). However, these schemes are more complicated than the shared encryption key scheme and the latter involve group interaction.

Anonymity Revocation

In situations where true anonymity exists, the source of information is completely untraceable. This may cause undesirable situations; for example, troublemakers, insiders, and criminals can act without fear of detection. Instead of true anonymity, revocable anonymity may be preferable. In systems providing revocable anonymity, anonymity is in place unless a specified event (e.g., court order) demands it be revoked and the identity of the offender revealed. Key escrow is a common mechanism used to provide revocable anonymity. D. Boneh, et al., *Anonymous Authentication with Subset Queries*, Proceedings of the 6th ACM conference on Computer and Communications Security, pp. 113-119 (1999) describes an interactive zero-knowledge scheme which supports identity escrow and key revocation (without having to issue new keys). The interactive communication required is logarithmic in the number of users. The system also provides unlinkability and allows users to be categorized into groups/subsets.

Revocable anonymity mitigates abuses by insiders in the system, but at a cost of confidence in true anonymity. The decision of whether or not to revoke anonymity depends on the situation. For example, within a company, employees may desire anonymity when communicating electronically, but the company may have the right to revoke anonymity if wrongdoing is suspected. On the other hand, if a community of competitive companies is contributing information to a joint venture, they may want their communications to be strictly anonymous with no possibility of revocation in order to protect proprietary information. Hence, instead of revocation of anonymity the present invention describes a protocol that enables anonymous message revocation. A bad message can be revoked, but there is no chance that the identity of the sender can be revealed.

Anonymous Communications

Even if the users employ some method to authenticate their messages to each other anonymously, if others are able to view the network communications it may be clear who the communicating parties were and the anonymity controls would be ineffective. Providing anonymous communications has been studied in detail and we just mention some of the methods here. See D. Chaum, *Untraceable Electronic Mail, Return Addresses and Digital Pseudonyms*, Communications of the ACM, vol. 24, no. 2, pp. 84-88 (1981) for one of the first discussions on the topic.

There are several different mechanisms presently in use to attempt to thwart traffic analysis. The simplest is called a Type 0 remailer. The Type 0 remailer simply strips identifying headers off the e-mail and forwards the message to the intended recipient. The originator's IP address is not revealed to the recipient since it is sent through an intermediate server, however this does not protect against someone who can observe the communication from the sender to the remailer server. Building on the Type 0 remailer is a Type 1 remailer. Here the e-mail message consists of a nested set of encrypted messages (similar to an onion structure) and is sent through a path of specialized re-encrypting routers called mixes. Mixes will only forward a message after receiving N messages (to defeat message tracking). Type 1 remailers are subject to spam attacks, some traffic analysis and replay attacks. A Type 2 remailer, sometimes called a mixmaster, is similar to a Type 1, but prevents traffic analysis and replay, by using padding, delay and reordering. There are several variants on these types of systems including several commercially available products.

Several web sites offer simple "anonymizing" email forwarding, with header removal and/or anonymous name substitution. Some offer anonymous web surfing, such as Anonymizer.com®. Typical sites offer a basic service for free, and upgraded service for a fee. Others are supported by advertising, or are simply operated as a public service.

The Cypherpunks (http://www.csua.berkeley.edu/cypherpunks/Home.html) have a mixmaster (type 2) remailer network with about twenty nodes. Forwarding latency (per hop) ranges from a few minutes to hours. Several sites post hourly latency statistics.

The present invention is of a cryptographic method and system for a group of users to electronically share information in an anonymous, yet authenticated way. However, anonymous communications open the door for undetectable system abuse. This can be dealt with by using revocable anonymity features, but that may be unacceptable for competitive communicating parties since it could reveal their identity. The present invention employs a multi-level communication structure that mitigates system abuse by allowing message revocation, yet retains true anonymity at the highest level.

SUMMARY OF THE INVENTION
(DISCLOSURE OF THE INVENTION)

The present invention is of a method of performing electronic communications between members of a group wherein the communications are authenticated as being from a member of the group and have not been altered, comprising: generating a plurality of random numbers; distributing in a digital medium the plurality of random numbers to the members of the group; publishing a hash value of contents of the digital medium; distributing to the members of the group public-key-encrypted messages each containing a same token comprising a random number; and encrypting a message with a key generated from the token and the plurality of random numbers. In the preferred embodiment, at least approximately 20,000 random numbers (preferably 256-bit) are generated. The digital medium is preferably a removable digital medium, such as a CD-ROM or DVD-ROM. In publishing a hash value, the Secure Hash Algorithm is preferably employed. A digital medium received by a user is rejected if a hash value of contents of the received digital medium does not equal the published hash value of the contents of the distributed digital medium. The token is preferably distributed daily and the distribution preferably comprises distributing a verification message comprising an element for each user, each element comprising the token encrypted with the corresponding user's public key, with a hash value of the verification message being published. A token is rejected if the hash value of the received verification message does not equal the published hash value of the distributed verification message or if every element of the verification message does not equal the received token encrypted with the corresponding user's public key. Symmetric key encryption is preferably employed, with one of the plurality of random numbers being chosen at random and the encrypted message being sent with an index to the randomly chosen number and a timestamp sufficient to enable the recipient to determine a proper decryption token. The group may be a domain, with optionally one or more members of the group being a domain. Preferably, anonymity of the sender of the message is maintained, including by causing the encrypted message to be transmitted over a network such that the recipient of the encrypted message receives no data concerning network routing of the encrypted message, most preferably via a network comprises employing onion routers, wherein the onion routers encrypt messages received by the onion routers with the public key of the recipient. The invention may provide absolute anonymity for communications between the members, including absolute anonymity as to authorship of the communications and as to electronic mail routing of the communications. The invention may provide relative anonymity for communications between the members, wherein anonymity is not provided for communications between members of the group within a same domain.

The invention is also of a method of performing anonymous electronic communications between members of a group wherein the communications are authenticated as being from a member of the group and have not been altered, comprising: generating a plurality of random numbers; distributing in a digital medium the plurality of random numbers to the members of the group; and encrypting a message with a key generated from a token and the plurality of random numbers while maintaining anonymity of authorship of the message.

The invention is additionally of a method of performing anonymous electronic communications between members of a group wherein the communications are authenticated as being from a member of the group and have not been altered, but wherein said communications are revocable, comprising: generating a plurality of random numbers; distributing in a digital medium the plurality of random numbers to the members of the group; encrypting a message with a key generated from a token and the plurality of random numbers; and permitting revocation of the message by a revocation authority comprising one or more of the members. In the preferred embodiment, permitting maintains anonymity of authorship of the message.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Figure 1:
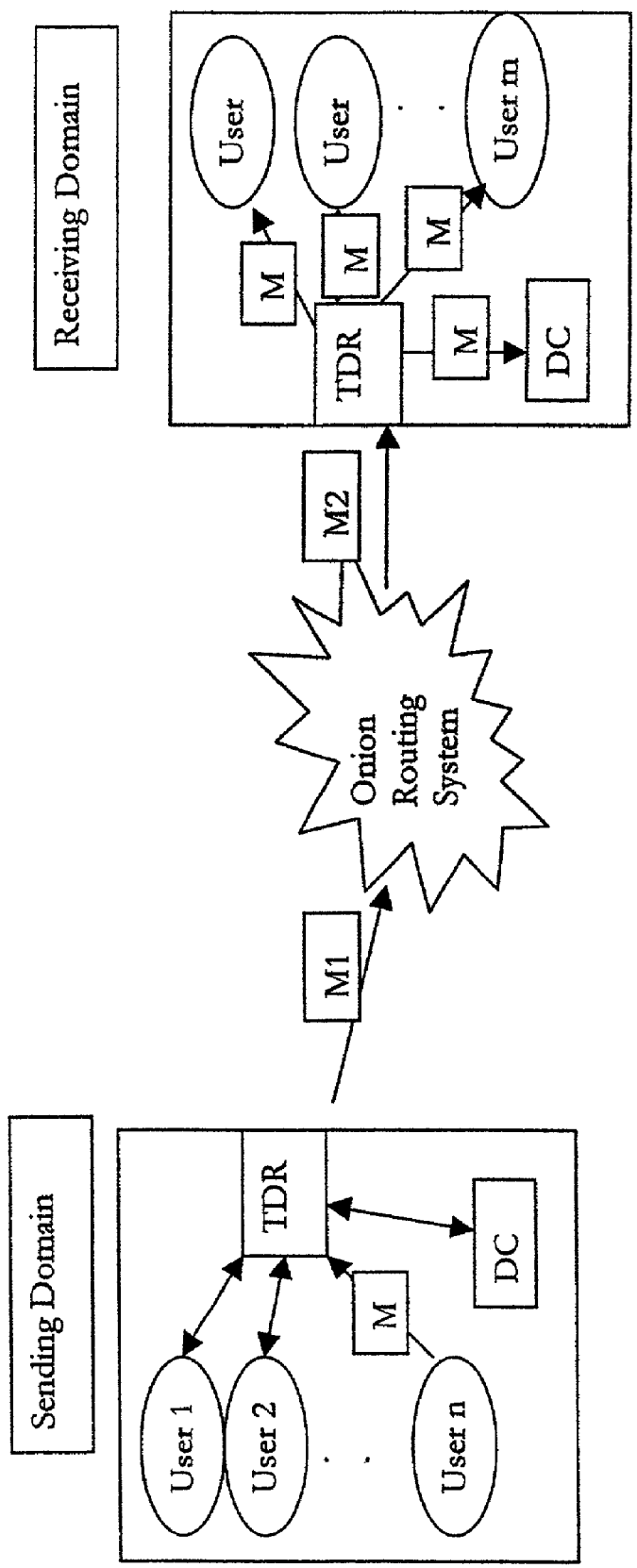
FIG. 1 illustrates according to the invention a user sending a message, M, through the system; a message, M, goes from a user to its TDR which in turn sends it through the Onion Routing System to the recipient TDR who distributes the message to the users in its domain; it is not possible to observe who the sending and receiving domain are by observing the onion router traffic.
Figure 2:
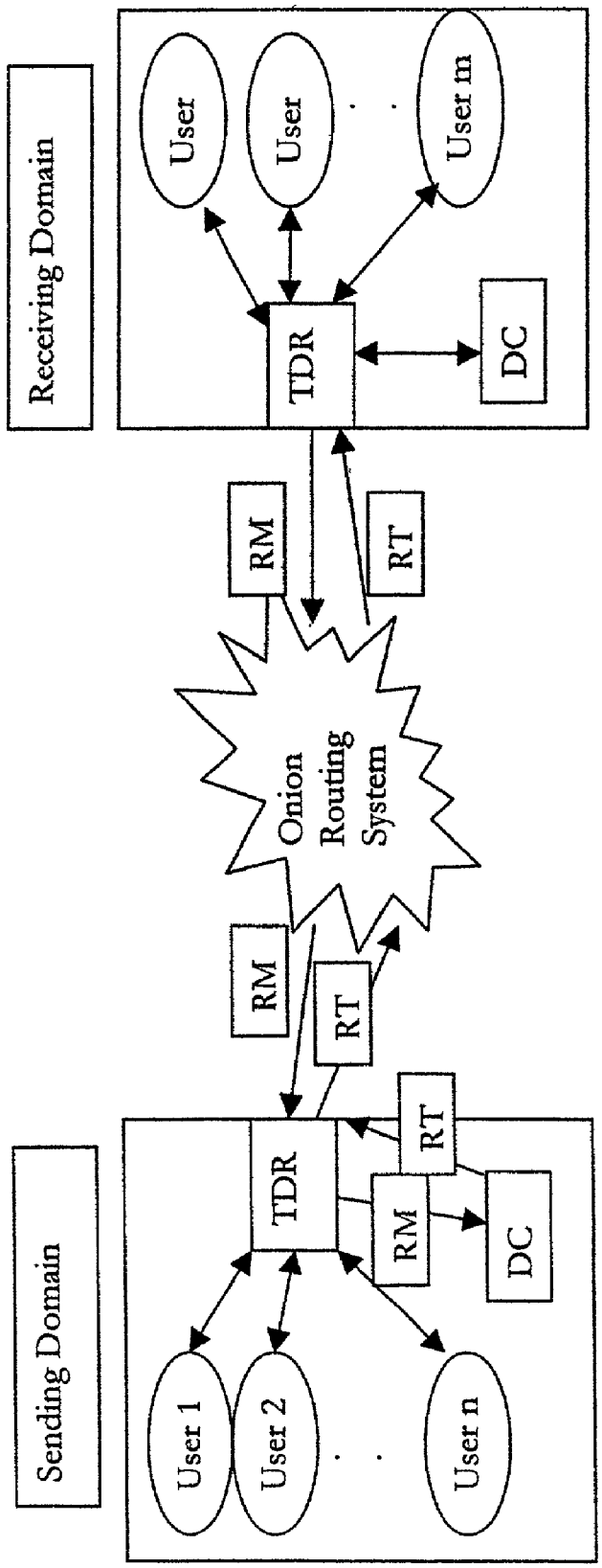
FIG. 2 illustrates the message revocation protocol according to the invention; a revocation message (RM) is sent back from the receiving domain to the DC of the sending domain via a reply onion; the RM contains a revocation token (RT) which, if desired, can be used to revoke the original message, M, by sending it back to the receiving domain.
Figure 3:
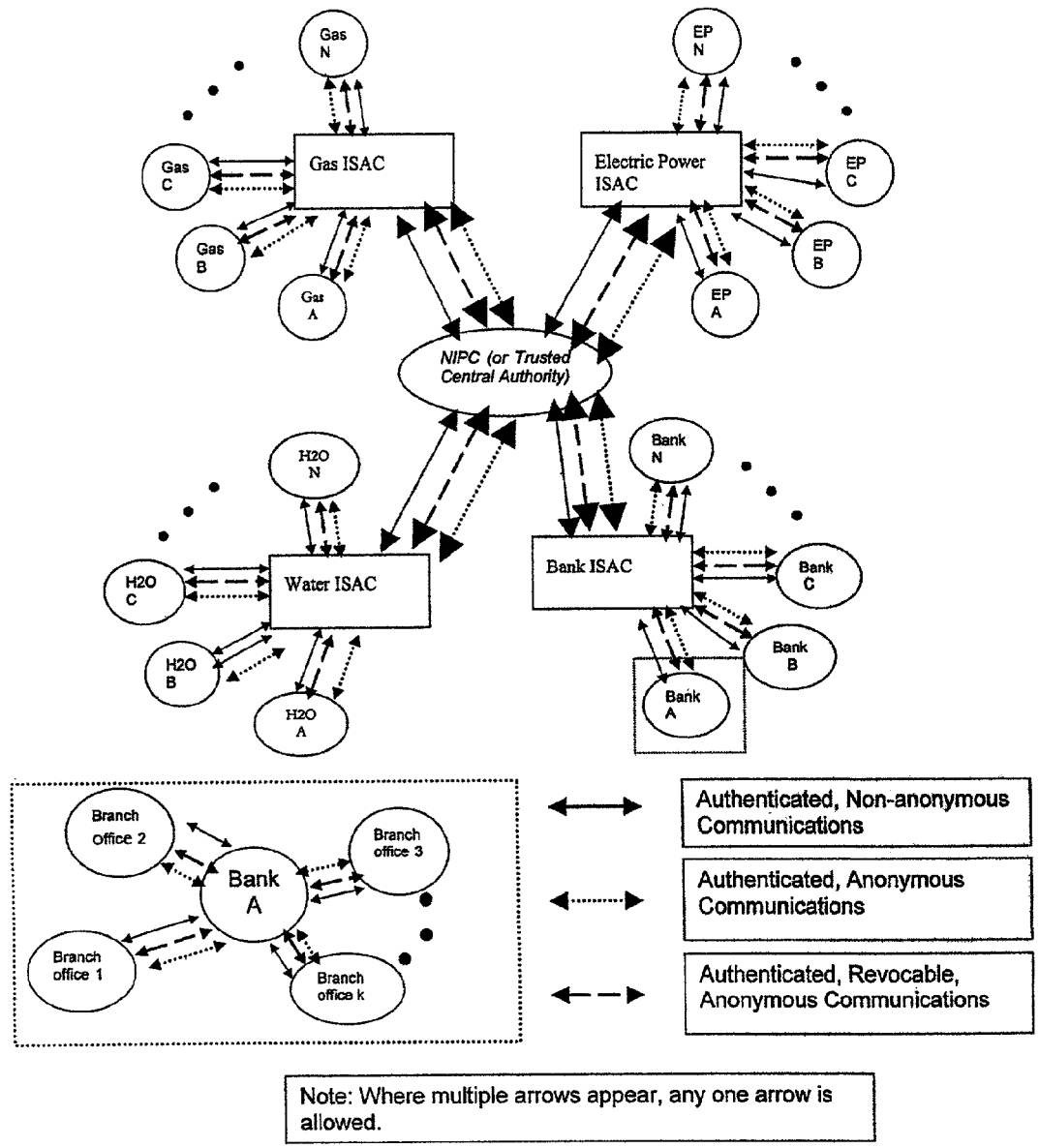
FIG. 3 illustrates the invention as described in Example 1, which additionally permits authenticated, anonymous communications and authenticated, revocable, anonymous communications.

Best Modes for Carrying Out the Invention

The present invention is of a cryptographic method and system for a group of users to electronically share information in an anonymous, yet authenticated way. That is, the group wishes to share information for common benefit, but they wish to keep their identities separate from the data they contribute. Furthermore, they may require that the data received is given by an authorized user only and that the communications be kept private. One example would be a group of business system administrators who wish to compile a database on experiences with computer attacks. The database would be a valuable source to all, nevertheless a business owner who relates such an experience may want to keep the identity of his business anonymous. Furthermore, it would be important that only authorized users contribute information since a malicious user could submit bad information that could, for example, lead to a computer attack rather than prevent one.

First, consider the anonymity of the data. To create an anonymous message, one can simply type a letter and leave out identifying information. However, hints to the identity of the author may be found in the message content; therefore, attention must first be paid to ensure that the content cannot identify the author. Sending an anonymous message can be as simple as sending the anonymous note in an envelope with no return address. An electronic analog may be to send an unsigned e-mail message and strip the identifying information from the e-mail header. There are, however, further considerations: for example, a postmark can identify the general location from which the letter was sent and there must be an address for the recipient. In an electronic transmission, it may be possible to observe the network traffic. Even if the message itself has no identifying information, if someone could observe the path of the data, then there is no anonymity. Therefore, any system that hopes to keep its users truly anonymous must provide a method to ensure the anonymity of the author's identity as well as the anonymity of the electronic communication path.

Next, consider the issue of authentication. If a system provides true anonymity, then there is also the opportunity to send false messages without consequence. In situations where action is taken on the basis of message content, false messages could cause undue panic and be very costly. Thus, messages must also be authenticated to ensure they come from an authorized user and that the message has not been corrupted since it left the source. This authentication to others can be done anonymously. One concern, however, is that even if messages are authenticated, there still may be system abuse by an authentic user: if messages can't be traced then an malicious insider can't be detected. One malicious insider could ruin the system.

The present invention thus provides for authenticated, anonymous communications, which includes anonymity of the message author, anonymous communication paths, authentication of the source, integrity of the data, and protection against system abuse by insiders. The present invention provides, in addition, privacy during communication.

Protocols

There are several ways to authenticate anonymous communications. The protocols used depend on the needs and attributes of the system model. The present invention preferably employs protocols that are relatively simple, secure, flexible, and minimize key update problems if the group membership is dynamic. Furthermore, group interaction is not required. A discussion of the model underlying the preferred protocols is next presented, followed by a discussion of the preferred protocols themselves.

The Model

A "user" of a system according to the invention may be an individual or an entire group (e.g., a business). A group may have multiple users at a site, yet wish to be identified as a single entity. A "domain" is a collection of one or more users identified as a single entity. Domain-to-domain communications are the communications between domains and intra-domain communications are the communications between users within a domain.

The protocols according to the invention provide anonymous, authenticated communications between domains. If a domain consists of multiple users (e.g., a company with several employees using the software) then one recognizes that the communications that must be anonymous to outside domains may not need to be anonymous to others within the same domain. (Certainly a business expects control over the communications of its employees.) Hence intra-domain communications are authenticated, but give the option for anonymity, revocable anonymity or no anonymity. This multi-level structure allows one to revoke messages anonymously at the domain-to-domain communication level. This message revocation protocol is what helps one mitigate the threat of an insider attack or misuse of the system. Insider attacks are particularly dangerous in the situation where abusers can hide their identity under the cloak of anonymity.

Trusted Third Party Assumptions. Assume that there is a trusted third party (TTP) that generates, updates and distributes cryptographic keying material. This is not an unusual assumption for protocols involving cryptographic algorithms; however, keying material can be generated in a distributed manner and thus eliminate the need for a TTP outside of system initialization. It is assumed that all users have access to the public verification key for the TTP.

PKI Assumptions. Assume that a Public Key Infrastructure (PKI) is in place, as understood by those of ordinary skill in the art. In particular, each user/domain may have associated public/private key pairs for encryption/decryption and/or signature/verification. Since the PKI gives any domain/user access to another user's public key, messages can be encrypted and sent to any specific domain/user securely and can be signed in cases where strict authentication is required such as in the distribution of keying material by the TTP. Although it is not required by the invention, it is considered good practice for different public/private key pairs to used for encryption/decryption and verification/signature algorithms.

Trusted Domain Router Assumption. Assume that each domain maintains a trusted router called the Trusted Domain Router (TDR). The purpose of the TDR is mainly to coordinate message traffic between the domain users and the communication system that delivers messages. The preferred communication system used to deliver the messages and maintain anonymity (thwart traffic analysis) is called an onion routing system and is described below.

Domain Committees. In order to protect against malicious/faulty use by insiders, it is preferred to allow domains to revoke messages sent from their site when such improper messages are detected. To help enable this revocation feature one preferably forms Domain Committees (DC). For example, the DC could consist of the Vice Presidents or some trusted members who serve as a review and approval board, etc. The DC will act as a censor body to determine whether to revoke messages. Each domain has its own DC.

Choice of Algorithms. The following text mentions use of hash, symmetric and asymmetric (public key) encryption/decryption and signature/verification algorithms. Although the choice of algorithms is independent of the invention, it is preferred to use a hash algorithm such as the Secure Hash Algorithm (SHA), a 128-bit symmetric key algorithm such as the new advanced encryption standard, Rijndael, a public key encryption/decryption algorithm such as RSA with 1024-bit modulus and a digital signature algorithm such as the Digital Signature Algorithm (DSA)

Domain-to-Domain Communications

The communication protocol described below details anonymous authenticated communications between domains. When a user wishes to send a message to another domain, the message is processed to remove any clues to the identity of the author and is encrypted for privacy, data integrity and authentication purposes. The encryption key used is generated per message based on two pieces of information: a set of random numbers from a CD (Compact Disk) and a token that is updated routinely. The purpose of this key generation process is twofold: first, requiring possession of a CD and knowledge of a frequently updated token helps ensure that only authentic users can generate a valid encryption key; second, the key generation process is verifiably uniform throughout domains so that no information as pertaining to the identity of the domain that generated the key can be ascertained. The encrypted message is sent to the receiving domain using a protocol that keeps the communications anonymous in the sense that traffic analysis is foiled. This allows for messages to be sent in a completely anonymous way yet with authentication that the sender and receiver are valid domains.

Although one is protecting against an attack by outsiders by requiring this authentication process, enabling anonymous communications raises the question of how to detect an insider abusing the system by sending false/corrupt messages. Hence, it is preferred to employ a message revocation capability to allow the DC to revoke messages sent from their domain. If bad messages are detected, the DC can revoke the message, but still maintain the domain's anonymity as the origniator of the message. This is an important feature: most revocation techniques would require the sending domain's identity to be revealed, thus revoking anonymity as well. To enable this service it is preferred to send what is essentially an anonymous reply envelope with the message to the receiving domain. This allows the receiver to send a reply back to the sender even though the sender is anonymous. The return reply is sent to the DC of the sending domain. It contains a revocation token and a copy of the message. The DC reviews the message, and if desired they can revoke the message by returning the corresponding revocation token. All of this is done without the receiver ever learning the identity of the sender.

Main Communication Protocol

The protocols described below are substantially set forth in C. Beaver, et al., "A Design for Anonymous, Authenticated Information Sharing", Proceedings of the IEEE Man, System and Cybernetics Information Assurance Workshop (June 2001), which is incorporated herein by reference.

This application first describes the communications protocol at a high level, then explains the sub-protocols in detail. The system initialization and update is the method by which the cryptographic keying material is preferably distributed. These components will be used to generate the keys to encrypt the messages. The key generation process requires use of a digital token (e.g., a random number) that should be updated regularly. The frequency with which the token is updated depends on the perceived threat to the system. The goal is to update the token before there is any possibility of compromise. The time interval between updates will be referred to as the system update interval. The current system update interval should be evident from the date and time.

Note that the protocols are transparent to the user—they are carried out by software installed on the user and other system machines. The only action the user must take when invoking the protocols is to insert a CD or like distribution medium.

Initialization and System Update. The following steps are preferably carried out:

1. When the system is first initialized, or whenever a compromise is detected or system refresh desired, the Setup and Update Protocol should be carried out.

2. At the beginning of each system update interval, the Token Generation and Verification Protocol should be carried out.

Anonymous Domain to Domain Communication Protocol. When a user wishes to send a message, M, the following steps are carried out:

1. The text of M is processed to eliminate clues of the author per the subprotocol Uniformizing Message Content.

2. A key is generated and M is encrypted using the Key Generation and Encryption Protocol, which produces the file ENC-MSG.

3. ENC-MSG together with the name of the recipient are encrypted with the public encryption key of the TDR and sent to the TDR.

4. The TDR follows the Send Message Protocol to prepare the message and return reply envelope and sends them to the onion router.

5. The onion routing system routes the message to the recipient's TDR.

6. Upon receipt of a message, the TDR Receive Message Protocol is used to process the message: it is decrypted and validated and a revocation token is sent back through the onion router to the sending domain with the provided return reply envelope.

7. The DC of the originating domain may review the message and may choose to use the Optional Anonymous Message Revocation Protocol to revoke the message.

Sub Protocols

Uniformizing message content. In order to maintain anonymity, all identifying information must be removed from the message. At a minimum, signature files, personal references, and any author identifying message content is removed. Furthermore, the message is run through some sort of pre-processing editor to remove such information. For the actual implementation, the specific functionality needed will depend upon the make-up of the group.

Anonymously authenticating the message. It is preferred to implement a form of authentication that uses symmetric key algorithms for encryption/decryption. One drawback to this is problems that arise if all users share only one key. Thus, instead of a single encryption key or even a set of encryption keys, a protocol for generating a new encryption key for each message is preferred. In order to do so, the user must have a physical object (a CD) as well as inside knowledge of a token that changes frequently. When a message is sent, it is encrypted with a key generated in this way and the message is accepted as valid if it can be decrypted properly. The anonymity of the sender is not compromised since all domains generate keys in exactly the same way using identical keying material.

Protocol: Setup and Update. Output: Random Number CD or similar distribution media (DVD (Digital VideoNersatile Disk), Zip disk, etc.).

1. The TTP generates a CD with preferably at least 20,000 randomly chosen 256-bit numbers.

2. Each legitimate user is given a copy of the Random Number CD.

3. The TTP computes the Hash value of the contents of the CD and publishes it in some mutually agreed upon location, for example in a newspaper.

4. Each user computes the Hash value of the contents of their received CD and compares it to the published Hash value.

5. The CD is accepted if and only if the Hash values match.

Protocol: Token Generation and Verification Output: Token.

1. At the beginning of each system update interval, the TTP generates a token, T. This token is a randomly generated number—much like a password for the day. T is a randomly chosen 128-bit number.

2. The token, T, is encrypted using the public encryption key of each domain and sent to each domain's TDR:

(a) Let the public encryption key for Domain i be denoted $K_i$ and denote by $E_p(K_i,m)$ the message m encrypted with public key encryption algorithm $E_p$ and key $K_i$; for example $E_p$=RSA.

(b) Let $M_i=E_p(K_i, T)$ and $S_i=Sig(KS,M_i)$ where $S_i$ denotes the TTP's signature of the encrypted message $M_i$ signed using the TTP's private signature key, KS, and some signature algorithm Sig (e.g. Sig=DSA). The pair $(M_i, S_i)$ is sent to the TDR for Domain i.

(c) The TTP computes the Hash value of T and publishes this Hash value in an agreed upon location.

3. Upon receipt of the pair $(M_i,S_i)$, each TDR checks that the received token is valid:

(a) The signature, $S_i$, of the TTP on the message $M_i$ is verified using the cryptographic verification algorithm that corresponds to the signature algorithm, Sig, used by the TTP in step 2c and the public verification key of the TTP. If verification fails, the protocol terminates and an error message is issued.

(b) The TDR for domain i decrypts $M_i$ using the domain private decryption key. Call the result T'. The TDR computes the Hash value of T' and compares it to the value published from 2(c). If the values match, then T=T' is accepted as the token, otherwise an error message is issued.

(c) The TDR encrypts T with the public encryption key of each domain user and sends them a copy. Each user decrypts and records T.

The Random Number CD and the token are the input into the key generation protocol. In order to ensure anonymity, each domain must be certain that they are all using the same inputs. Verification that all domains have the same CD is carried out in steps 3, 4, and 5 of the Setup and Update Protocol. The proof that each domain receives the same token from the TTP is carried out in step 3 of the Token Generation and Verification Protocol. Since a Hash algorithm is essentially a one-way function, the Hash of the CD and token can be published in some public location. The Hash value will not reveal any information about the content of the CD or the token. Hence this gives a way for users to verify they all have the same keying material without revealing any secrets. The TTP's signature on the token ensures that a bogus message has not been substituted.

The next protocol is the only protocol that requires user input. The input is minimal: the user need only insert their random number CD. The rest of the protocol is carried out in the software on the user's machine.

Protocol: Key Generation and Encryption Input: Message, Date/Time, Token, Random Number CD. Output: Encrypted message file, ENC-MSG.

1. Generate an encryption key:
   (a) Insert the Random Number CD.
   (b) DONE=FALSE
   (c) Repeat until DONE
      (i) Generate a random number, r between 1 and N (where there are N random numbers on the CD).
      (ii) Read in the r-th random number on the CD, $n_r$.
      (iii) Compute $h_1$=Hash($n_r$) and $h_2$=Hash(T)
      (iv) If the last ten bits of $h_1$ equal the last ten bits of $h_2$, then DONE=TRUE.
   (d) Compute the encryption key for this message: K=Hash (T||$n_r$||T). If the key size of the key needed for the chosen encryption method is smaller than the size of the hash output, select enough low bits of the hash value to make the cipher key.
2. Encrypt the message: E(K,message) Here E is a symmetric key encryption algorithm such as Rijndael.
3. Create a file, ENC-MSG, containing the encrypted message, E(K,message), the index of the random number used in step 1c, r, and the date/time.

The file ENC-MSG must contain the index of the random number used in step 1. (*c*). (ii) and the date/time so the recipient can reconstruct the key in order to decrypt. The date/time should include enough detail so that the token that was current during that system update interval can be determined. The ENC-MSG file and name of recipient are then sent to the TDR for final processing for delivery through the onion router.

Requiring both the possession of the CD and the knowledge of the current token minimizes the risk of key compromise. A stolen CD is no good to a thief unless they also have access to the token that is currently valid. We suggest perhaps updating the token daily at midnight, however the token should be updated as frequently (or infrequently) as is needed to ensure that it has not been compromised. To mitigate the possibility of someone stealing a CD, there can be policies in place to require physical control of the CD such as keeping the CD in a safe and requiring sign out for use. Such a controlled environment would help detect a stolen CD, which would alert users to a potential problem. Note that it is not possible for someone to generate a valid key with just knowledge of a few of the keys on the CD. If someone copies down some of the random numbers off the CD (to avoid detection of a stolen CD), the odds are extremely unlikely that those numbers will be valid numbers for the current token (step 1c of the Key Generation and Encryption protocol). So even if a person knows some of the keys and the token, the probability is very small that they would be able to generate a valid encryption key. We should note however that the condition required in step 1c of the Key Generation and Encryption protocol is not too restrictive for someone in possession of the CD: if the CD contains 20,000 values, then on average 20 of the numbers on the CD will pass the test in step 1c. These strategies minimize the need to update the CD when users leave the group and so minimize key management problems if the group membership is dynamic.

Anonymize the communication route. Even though all identifying information has been removed from the message, an observer of the network may trace the path of the message from the sending to the receiving domain, effectively removing the anonymity. To mitigate the possibility of traffic analysis, it is preferred to employ an onion router. The onion router thwarts traffic analysis and also provides the capability to send return replies to the anonymous sender.

Onion Routers. In an onion routing network, rather than connecting directly to a socket on the machine one wishes to communicate with, a user instead communicates by passing messages through a sequence of machines called onion routers that sit between the two communication endpoints. When the source of a message wishes to initiate a conversation with another machine, an "onion" that establishes this sequence of machines is built. An onion is a multi-layered data structure that represents the sequence of machines that form the anonymous connection. The innermost layer of the onion contains a marker to let some onion router know it will be forwarding data to the final destination. This layer is encrypted so that only this final router can read its contents. A new layer is added by tacking on some bookkeeping information and the address of the final router in the sequence. The onion is then encrypted so that only the penultimate router can access this new layer. The third layer contains more bookkeeping information and the address of the penultimate router, and is encrypted for the third-to-last router, and so on. After construction, the onion is sent into the network where, at each stop, the current router decrypts and strips off its information before passing the remaining onion to the next hop in the sequence. The end result of this process is that a path between the two endpoints is set up, where each router along the way knows only from whom it is receiving messages and where to forward those messages next. Once the path is set up, and all identifying information has been stripped from the message to be sent, the message is divided into equal length cells, padding cells with random data if needed, and the cells are sent into the path. As the cells move through the network, they are encrypted in a different key at every link until they reach their final destination.

Because all identifying information has been removed from the data stream, the onion routing network provides the primary goal, end-to-end anonymity. However, the structure of the network provides much more: Because each router knows only the immediate source and destination of any piece of data, as long as a single router is not controlled by a malicious party, no third party can determine the identity of both endpoints of a conversation; The bookkeeping data included in the onion allows for two-way communication. Encrypting the data with a different key at every link ensures privacy, along with making every cell look different entering a router than it does leaving that router. This change in appearance, coupled with the identical size of every data cell helps to foil traffic analysis. If two cells enter a router from two different sources, and later, two "new" cells leave the router, as long as there is some random reordering of the cells, there is no way to tell which exiting cells corresponds with which incoming cells. Finally, if the network traffic is heavy enough, the delays introduced in reordering the sequence of cells and the delays created by decryption and encryption of the cells become negligible. As such, the onion routing network achieves the desired goal of anonymous, private, bi-directional, near real time communication.

Finally, if the initiator of an onion routed connection wishes, he can create a "reply onion" that will allow the user at the other endpoint to contact him after the initial anonymous connection has been torn down. In essence, the reply onion is just an inverted onion where now the innermost layer of the onion points the final router to the creator of the onion, so a path can now be set up from the "destination" to the "source". It is important to note that this source need not be the initiator of the original conversation, but rather any address that initiator wishes to have replies sent to. Furthermore, the return path need not be the reverse of the original path, but could be completely different. For more information on onion-routing systems, see P. Syverson, et al., "Anonymous connections and onion routing", *IEEE Journal on Selected Areas in Communication*, v. 16, no. 4, pp. 482-494 (1998).

Trusted Domain Router (TDR). The onion router system requires that messages be sent to it with a corresponding onion and reply onion already created. This ensures that any router in the onion network knows only previous and subsequent hops in the communication route. This generally implies that the message and reply onion will be created at the point of message origin—on the user's machine. When returned along the path specified in the reply onion, the reply will contain the revocation token by which the committee can revoke a bad message if necessary. It is imperative that this reply is delivered and readable only to the DC. However, since the sender (who in this case is the potential wrongdoer) would create the reply onion this gives an obvious method for the wrongdoer to subvert the system. One could prevent message revocation by simply having the reply onion sent back to himself or herself instead of the DC and then not cash in the revocation token. The message would be considered good. The present invention avoids this by modifying the communications model slightly. Instead of the user creating the message and reply onions they are created by a trusted domain router (TDR). All users in the domain send their messages to the TDR which then creates all onions and sends the onions to the onion routing network.

Traffic Analysis of the Intra-Domain communications. The introduction of a TDR to route information to/from the onion routing network and the users introduces vulnerability in the traffic analysis protection. If someone could observe the domain traffic to/from the TDR it might be the case that despite the onion router, information could be gained about a sender or receiver of a message. This problem is solved via encryption and by inserting false messages into the system. All messages to the TDR are encrypted with the domain public encryption key and all messages from the TDR are encrypted with the public encryption key of the recipient. In addition it is recommended that bogus messages be routinely inserted into the message traffic between users and the TDR and between the TDR and the onion-routing system. An eavesdropper should not be able to tell the difference between a real encrypted message and a false message.

Protocol: Send Message. Input: Encrypted message containing ENC-FILE and recipient name. Output: Message, Reply Key, Onion and Reply Onion.

1. Upon receipt of a message outgoing from its domain, the TDR decrypts the message using its private decryption key to get the ENC-MSG file and name of the domain to which the message is being sent.

2. The TDR generates a random 128-bit reply key, RK.

3. The TDR encrypts RK with the Public Encryption Key of the DC and sends a copy to the DC.

4. The TDR creates the file SEND-FILE that consists of the ENC-MSG file and RK encrypted with the public encryption key of the recipient.

5. The TDR creates an onion and a reply onion with the return address being that of the DC.

6. The TDR sends a message onion, reply onion and SEND-FILE to the onion router system.

Protocol: Receive Message. Input: SEND-FILE. Output: Message or Invalid message warning, Revocation Token.

1. Upon receipt of and incoming message, SEND-FILE, the receiving TDR decrypts the file with the domain private decryption key to extract the RK and ENC-MSG..

2. The TDR carries out the Decryption and Authenication Protocol to decrypt and authenticate the message. If the message does not authenticate an invalid message warning is issued and the protocol terminates.

3. The TDR encrypts the authenticated message with the public encryption key of all domain users and sends a copy to each member.

4. The TDR creates a random 128-bit revocation token, RT associated with the message.

5. The TDR encrypts RT and a copy of the decrypted message with the reply key RK and sends the result back to the sender with the reply onion that was provided.

Protocol: Decryption and Authentication. Input: Encrypted message file, ENC-MSG, Random number CD, Token. Output: Either decrypted message or invalid message warning.

1. Upon receipt of an encrypted message file, ENC-MSG, read in the date/time, the index, r, and the encrypted message M.

2. Let T be the token corresponding to the system update interval for the date and time specified 3. Let n be the r-th random number from the CD.

4. Let $h_1$=Hash(n) and $h_2$=Hash(T)

5. If the last ten bits of $h_1$ DO NOT equal the last ten bits of $h_2$ then reject the message as invalid, issue an invalid message error and terminate the protocol.

6. Let K=Hash($T\|n_r\|T$). If the key size of the key needed for the chosen encryption method is smaller than the size of the hash output, select enough low bits of the hash value to make the cipher key.

7. If D(K,M) is an intelligible message then accept the message as valid. Here D is the decryption algorithm corresponding to the encryption algorithm used in step 2 of the Key Generation and Encryption Protocol.

Protocol: Optional Anonymous Message Revocation. Input: Encrypted reply with message and Revocation Token. Output: None or revoked message notification.

1. When the DC receives a reply onion, it decrypts the message with the corresponding RK (which was sent to them earlier) to read the original message (sent from some user in their domain) and the revocation token, RT.

2. The DC reviews the message and determines its validity. If valid, the protocol terminates and no action is required.

3. If the message is not valid, the DC encrypts the RT with the public encryption key of the receiving domain. This is then encrypted with the public encryption key of the TDR and sent to the TDR.

4. The TDR decrypts the message, creates an onion and sends it to the receiving domain through the onion routing system.

5. The receiving TDR decrypts the message, discovers the returned RT and appropriate action is taken.

How the sender's domain committee decides which messages to revoke and what the recipient domain does with the revoked message is a policy matter to be determined by the users beforehand. For example, the message could be revoked simply upon majority vote by the sending domain committee. When a receiving domain learns a message has been revoked, it could simply flag the message and notify all recipients or post some sort of cancel notice. The practice of having a committee review an important document for approval is not uncommon and so this procedure is rather natural in the settings envisioned.

Within the domain, the level of anonymity can vary. Three options are described.

Intra-Domain Communications

Within each domain there may be multiple users and there may or may not be a need for anonymity. For example, an employee usually does not expect to have anonymous communications and in fact companies generally prefer to monitor their workers. Hence, the invention allows communications within the domain to be more flexible: they may be open (authenticated, but not anonymous); anonymous with revocable anonymity features (where the identity of the malicious user can be learned); or strictly anonymous as described above. This gives the design great flexibility. Note that each domain can select different communication rules for within their domain.

Intra-domain communications with strict anonymity. If the users wish to maintain anonymity within the domain, the above protocols are carried out with no modification. If a domain committee decides a message is bad, they can revoke it using the revocation token, but they have no way to learn the identity of the sender within their domain. If this is not desirable, the following two alternatives are recommended.

Intra-domain communications without anonymity. In this scenario, the users will not have anonymity between users within their domain. Before the message is sent, the TDR logs a copy of the message along with the identity of the sender. At any time any user in the domain can check and see who sent which messages. In particular, when the DC receives notice that a message has been sent from their domain, they can check the log at their TDR, find out who sent the message, and take appropriate action if the message turns out to be bad.

Intra-domain communications with revocable anonymity. In this scenario, the users will have anonymity unless there is suspicion of abuse. Assume that the domain is equipped with a public-private key pair, where the private key is split among the domain-authorized committee members. Alternatively, the DC may employ a threshold scheme to share the key. This means that something that has been encrypted with the domain public key can only be decrypted if a quorum of the committee members get together to reconstruct the private key. As before, a user sends a message following the invention protocols. In this case, the message header (before it is sent) includes an identifier of the machine that sent the original message. This identifier is randomly padded and encrypted with the public key of the domain and appended to the message. Note that the anonymity of the message is still retained because only the sending domain has the corresponding private key that could decrypt the identifier. The message and identifiers are not logged. All identifiers are then removed and the message is sent. If, upon receipt of the return reply message and revocation token, the DC members agree the message is invalid, the private-key of the domain may be reconstructed and used to decrypt the identifier that was appended to the message. They can then identify the domain user who sent the false message and appropriate action can be taken.

Note that if only a few domains are using this revocability feature, then only a few would have this random information appended to the message and that may give away information. Therefore if any domain in the system is using this feature, it is recommended that all domains add commensurate random information to their messages to maintain uniformity. Furthermore, if some message, in particular this identifier, is encrypted with RSA, but the public key that was used is unknown, it may still be possible to get some information about which public key was used from the size of the encrypted message. In particular, some public keys whose modulus is too small may be excluded. To thwart this problem a new enlarged message size larger than the modulus of the largest public key should be specified when encrypting this identifier. Adding a random multiple of the modulus anonymizes the encrypted messages. This leaves them equivalent under RSA, while they become randomly distributed in the larger interval, concealing clues about the modulus size. The enlarged size should be at least 20 bits more than the largest public key.

Alternative Embodiments

If there is no TTP, then the keying information can be generated using a threshold scheme where each domain contributes to the generation of the token. The domain members then would carry out a secure distributed, threshold random number generation protocol to generate the token once for each time period. This can also be used to generate the initial random numbers for the CD. These protocols would be incorporated into the System Initialization and Token Generation Protocols and then a TTP would not be required.

It is envisioned that one useful application of this invention is in a situation where a group of users are contributing/sharing information coordinated through some central location. For example, the information could be posted on a bulletin board or compiled in a database. The recipient in this case would always be this central location, which can serve to simplify some of the protocols. In particular, the protocol for revoking messages could be replaced as follows: The center posts the message on the bulletin board along with a revocation token, RT (plus a hash of the token) encrypted in the message's attached reply key. (The center does not post the RK, of course.) All domains read the board and attempt to decrypt the RT with any RK's they have available, using the hash to see if it worked. This would let domains only remember RK's and avoid the need to log messages or send along reply onions. Or, if they do log outgoing messages, they could determine if they owned a bulletin board message by comparing it—or a logged hash—and only then attempt decryption of RT.

INDUSTRIAL APPLICABILITY

The invention is further illustrated by the following non-limiting example.

EXAMPLE 1

One application of the invention is in support of Information Sharing and Analysis Center (ISAC) activities detailed in President Clinton's Presidential Decision Directive 63 (PDD63) and which have been included as part of President Bush's Executive Order "Critical Infrastructure Protection in the Information Age." They refer to the creation of ISACs developed and supported by industry infrastructure specific individual industry owners. The industry owners may communicate infrastructure and cyber problems or issues to their ISAC. This ISAC may then send this information on to a central government agency (e.g., the National Infrastructure Protection Center (NIPC)) where this data will be evaluated with data from other sources to see if there is a larger problem or threat. In such a model the individual industry users may be members of an Electric Power Owner or Water Company, etc. The ISAC members may be representatives from a particular set of industry providers (e.g., Electric Power, Gas or Oil, Water, Banking and Finance, Telecommunications, Transportation, Emergency Services).

In this scenario, each ISAC is set up to collect information from the individual industry owners in its sector. Using the protocols of this invention would ensure to each industry owner that their contribution of information to the ISAC was anonymous, yet would guarantee to the ISAC collection site that any data contributed did, in fact, originate from a valid industry owner. The ISAC collection center would be a domain and each owner together with any of its sources would be a domain. As described above, the ISAC would be the central location (i.e., the receiver of all the messages). The communications from the industry owners would be strictly anonymous to the ISAC, however within the domain of each owner the communications between the various sites/sources could be authenticated with or without anonymity and with or without revocable anonymity. Each domain can determine its own requirements for anonymity and revocable anonymity.

At the same time, several domains might be aggregated into one which has its own instantiation of the anonymity and authentication protocols. At this level, for example, each ISAC together with all its industry owners that it collects data from could be considered a single aggregated domain. This example represents a two-level system where the ISAC would forward the information onto NIPC (or some other data collection organization) to act as the central location. There is no restriction on the number of domains that can be accommodated or how each domain configures its anonymity and revocable anonymity choices.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of performing electronic communications between members of a group wherein the communications are authenticated as being from a member of the group and have not been altered, the method comprising the steps of:
    generating a plurality of random numbers;
    distributing in a digital medium the plurality of random numbers to the members of the group;
    publishing a hash value of contents of the digital medium;
    distributing to the members of the group public-key-encrypted messages each containing a same token comprising a random number; and
    encrypting a message with a key generated from the token and the plurality of random numbers;
    wherein the step of distributing a token comprises distributing a verification message comprising an element for each user, each element comprising the token encrypted with the corresponding user's public key, and the method additionally comprises the step of publishing a hash value of the verification message.

2. The method of claim 1, wherein the generating step comprises generating at least approximately 20,000 random numbers.

3. The method of claim 2, wherein the generating step comprises generating 256-bit random numbers.

4. The method of claim 1, wherein the step of distributing in a digital medium comprises distributing in a removable digital medium.

5. The method of claim 4, wherein the step of distributing in a digital medium comprises distributing in a medium selected from the group consisting of CD-ROMs and DVD-ROMs.

6. The method of claim 1, wherein the steps of publishing a hash value comprises employing a Secure Hash Algorithm.

7. The method of claim 1, additionally comprising the step of rejecting a digital medium received by a user if a hash value of contents of the received digital medium does not equal the published hash value of the contents of the distributed digital medium.

8. The method of claim 1, wherein the step of distributing a token is performed daily.

9. The method of claim 1, additionally comprising the step of rejecting a token received by a user if a hash value of a received verification message does not equal the published hash value of the distributed verification message.

10. The method of claim 9, additionally comprising the step of rejecting a token received by a user if every element of the verification message does not equal the received token encrypted with the corresponding users public key.

11. The method of claim 1, wherein the encrypting step comprises employing symmetric key encryption.

12. The method of claim 1, wherein the encrypting step comprises choosing randomly one of the plurality of random numbers.

13. The method of claim 12, additionally comprising the step of sending the encrypted message with an index to the randomly chosen number and a timestamp sufficient to enable a recipient to determine a proper decryption token.

14. The method of claim 1, wherein the group is a domain.

15. The method of claim 1, wherein one or more members of the group is a domain.

16. The method of claim 1, wherein anonymity of a sender of the message is maintained.

17. The method of claim 1, wherein the method provides absolute anonymity for communications between the members.

18. The method of claim 17, wherein the method provides anonymity as to authorship of the communications and as to electronic mail routing of the communications.

19. The method of claim 1, wherein the method provides anonymity for communications between the members by not providing for communications between members of the group within a same domain.

20. A method of performing electronic communications between members of a group wherein the communications are authenticated as being from a member of the group and have not been altered, the method comprising the steps of:
    generating a plurality of random numbers;
    distributing in a digital medium the plurality of random numbers to the members of the group;
    publishing a hash value of contents of the digital medium;
    distributing to the members of the group public-key-encrypted messages each containing a same token comprising a random number; and
    encrypting a message with a key generated from the token and the plurality of random numbers;
    wherein anonymity of a sender of the message is maintained; and
    additionally comprising the step causing the encrypted message to be transmitted over a network such that a recipient of the encrypted message receives no data concerning network routing of the encrypted message.

21. The method of claim 20, wherein the step causing the encrypted message to be transmitted over a network comprises employing onion routers.

22. The method of claim 21, wherein employing onion routers comprises encrypting messages received by the onion routers with a public key of the recipient.

23. A method of performing electronic communications between members of a group wherein the communications are authenticated as being from a member of the group and have not been altered, the method comprising the steps of:
generating a plurality of random numbers;
distributing in a digital medium the plurality of random numbers to the members of the group;
publishing a hash value of contents of the digital medium;
distributing to the members of the group public-key-encrypted messages each containing a same token comprising a random number; and
encrypting a message with a key generated from the token and the plurality of random numbers;
wherein the method provides relative anonymity for communications between the members; and
wherein anonymity is not provided for communications between members of the group within a same domain.

24. The method of claim 23, comprising the steps of:
generating a plurality of random numbers;
distributing in a digital medium the plurality of random numbers to the members of the group; and
encrypting a message with a key generated from a token and the plurality of random numbers while maintaining anonymity of authorship of the message.

25. The method of claim 23, comprising the steps of:
generating a plurality of random numbers;
distributing in a digital medium the plurality of random numbers to the members of the group;
encrypting a message with a key generated from a token and the plurality of random numbers; and
permitting revocation of the message by a revocation authority comprising one or more of the members.

26. The method of claim 25, wherein the permitting step maintains anonymity of authorship of the message.

* * * * *